United States Patent
Christopher

(10) Patent No.: US 7,290,834 B2
(45) Date of Patent: Nov. 6, 2007

(54) HYDRAULIC VEHICLE SEAT ADJUSTMENT SYSTEM

(75) Inventor: Hugh H. Christopher, West Bridgford (GB)

(73) Assignee: Lear Corporation, Southfield, MI (US)

( * ) Notice: Subject to any disclaimer, the term of this patent is extended or adjusted under 35 U.S.C. 154(b) by 212 days.

(21) Appl. No.: 10/997,487

(22) Filed: Nov. 24, 2004

(65) Prior Publication Data
US 2005/0088025 A1    Apr. 28, 2005

(30) Foreign Application Priority Data

| Oct. 22, 2003 | (GB) | ................. 0324552.9 |
| Oct. 22, 2003 | (GB) | ................. 0324558.6 |
| Dec. 10, 2003 | (GB) | ................. 0328724.0 |
| Dec. 15, 2003 | (GB) | ................. 0328942.8 |

(51) Int. Cl.
    *B60N 2/02* (2006.01)
(52) U.S. Cl. ............ 297/344.19; 297/344.16; 297/362.13
(58) Field of Classification Search .......... 297/344.16, 297/344.19, 362.13; 91/420, 265, 278, 268; 60/470, 474, 387
See application file for complete search history.

(56) References Cited

U.S. PATENT DOCUMENTS

| 2,615,499 A | * | 10/1952 | De Loss ............... 297/325 |
| 2,884,047 A | * | 4/1959 | Abbott ............... 297/339 |
| 3,150,898 A | * | 9/1964 | Knudson ............. 297/329 |
| 3,368,845 A | * | 2/1968 | Watanabe ........... 297/330 |
| 3,436,048 A | * | 4/1969 | Greer ................. 248/397 |
| 3,760,911 A | | 9/1973 | Porter et al. |
| 3,777,617 A | | 12/1973 | Okiyama |
| 3,860,098 A | | 1/1975 | Porter et al. |
| 3,927,911 A | | 12/1975 | Rosquist |
| 4,550,750 A | | 11/1985 | Korth |
| 4,720,143 A | | 1/1988 | Schwartz et al. |
| 5,435,625 A | * | 7/1995 | Weber ............... 297/362.13 |
| 5,743,591 A | | 4/1998 | Tame |
| 6,015,130 A | | 1/2000 | Kigel |
| 6,047,797 A | | 4/2000 | Popjoy |
| 6,059,253 A | | 5/2000 | Koutsky et al. |
| 6,142,564 A | | 11/2000 | Pajela et al. |
| 6,161,633 A | | 12/2000 | Broom |

(Continued)

FOREIGN PATENT DOCUMENTS

DE    202 15 969    2/2003

(Continued)

*Primary Examiner*—Joe Edell
(74) *Attorney, Agent, or Firm*—MacMillan, Sobanski & Todd, LLC

(57) ABSTRACT

A hydraulic vehicle seat adjustment system for providing positional adjustment of at least two seat adjustments of a vehicle seat. The system comprises a common source of hydraulic fluid, and a control unit which selectively controls and directs hydraulic fluid from the common source of hydraulic fluid to respective first and second actuators to adjust the respective different seat adjustments, for example fore and aft position of the seat, and seat back angle. The system may further also comprise a seat position determining unit connected to the control unit and to a common fluid flow sensor to determine the flow of hydraulic fluid from the common source of hydraulic fluid to the respective first and second actuators and to thereby determine the adjusted position of the respective actuators and so of the respective seat adjustment.

14 Claims, 2 Drawing Sheets

U.S. PATENT DOCUMENTS

| | | |
|---|---|---|
| 6,382,491 B1 | 5/2002 | Hauser et al. |
| 2002/0130542 A1 | 9/2002 | Ellerich et al. |
| 2003/0209929 A1 | 11/2003 | Muin et al. |

FOREIGN PATENT DOCUMENTS

| | | |
|---|---|---|
| DE | 101 52 561 | 5/2003 |
| EP | 0 316 675 | 5/1989 |
| EP | 0 878 348 | 11/1998 |
| EP | 1 077 153 | 2/2001 |
| EP | 1 188 608 | 3/2002 |
| GB | 897955 | 6/1962 |
| GB | 2 167 494 | 5/1986 |
| GB | 2 173 344 | 10/1986 |
| GB | 2 365 947 | 2/2002 |
| JP | 2000-289507 | 10/2000 |
| WO | 03/026921 | 4/2003 |

* cited by examiner

HYDRAULIC VEHICLE SEAT ADJUSTMENT SYSTEM

CROSS REFERENCE TO RELATED APPLICATIONS

This application claims priority to Great Britain Patent Application No. 0328942.8 filed Dec. 15, 2003, the disclosures of which are incorporated herein by reference; Great Britain Patent Application No. 0324552.9 filed Oct. 22, 2003, the disclosures of which are incorporated herein by reference; Great Britain Patent Application No. 0324558.6 filed Oct. 22, 2003, the disclosures of which are incorporated herein by reference; and Great Britain Patent Application No. 0328724.0 filed Dec. 10, 2003, the disclosures of which are incorporated herein by reference.

BACKGROUND OF THE INVENTION

The present invention relates to adjustable vehicle seats, in particular hydraulically adjustable automotive vehicle seats, and to determining the position of the adjusted vehicle seat.

In order to comfortably accommodate various sizes and shapes of occupants vehicle seats are generally provided with various adjustment mechanisms to adjust the position of the seat within the vehicle and/or move various movable portions of the seat. Typically for example vehicle seats are provided with multiple adjustments including fore and aft adjustment, and seat back pivotal adjustment to adjust the angle of the seat back to the bottom cushion of the seat can be adjusted. Other adjustments may also be provided to, for example, adjust the height of the vehicle seat, angle and tilt of the seat bottom cushion, position of the headrest, and/or the lumber support etc. More and more seat adjustment is now increasingly being demanded.

The seat adjustment, or at least the main seat adjustments are increasingly power operated. Power operated arrangements conventionally utilise multiple individual electric motors to drive each adjustment. It has also been proposed to utilise hydraulic adjustment arrangements comprising hydraulic actuators operatively connected between the movable portions of the seat with suitable control valves to prevent fluid flow and lock the seat position. An example of a powered hydraulic adjustment system is described, for example, in U.S. Pat. No. 5,435,625.

Hydraulic powered arrangements offer the prospect of extremely quiet, near silent, smooth and almost infinitely variable adjustment operation without noisy mechanical gearing. In spite of this hydraulic adjustment arrangements have not been widely adopted principally due to perceived complexity and high cost. Improvements to conventional hydraulic adjustment systems, in particular addressed to reducing the costs and complexity would therefore be generally desirable in order to allow such systems, with their advantages, to be practically implemented.

In relation to hydraulic systems a distinction must be drawn between hydraulic or fluid powered adjustment systems, and the more basic and simple hydraulic locking systems and/or damper arrangements.

Many powered adjustment systems (including both electric or hydraulic) also include seat position measurement arrangements to determine the adjusted position of at least some of the seat adjustment in order to monitor and/or control the seat adjustment. Such arrangements in particular also allow a specific seat position for a particular occupant to be stored in a memory and the seat then automatically adjusted to this preset seat position. Measurement of the seat position may also be used to alter the settings of various occupant protection systems, for example the vehicle airbags, in order to optimise the protection when the seat is in a particular position.

Conventional seat position measurement arrangements comprise individual sensor arrangements which are provided in association with each seat adjustment. For example individual shaft encoders may be used with the various seat adjustment electric drive motors to monitor their operation and rotation and number of revolutions, from an initial position and determine the adjusted position. Other seat position measurement arrangements may also be used to more directly measure and monitor the adjusted position of various different seat adjustments.

Whilst such seat position measurement arrangements function adequately, as the number of seat adjustments provided and to be monitored increases the number of individual seat position sensors that are required in such conventional seat adjustment systems increases. This undesirably adds to the complexity of the seat and seat control system with the additional sensor arrangements and additional wiring increasing costs, making assembly more difficult and costly, and possibly also increasing reliability problems with their being further scope for failure of the multiple individual sensor arrangements.

Furthermore with hydraulic powered systems direct seat position measurement arrangements are typically required to for example measure the extension of the respective hydraulic cylinder actuators, or seat adjustment itself, which can be relatively complex, costly, and are susceptible to damage.

It is therefore desirable to provide an improved system and method for vehicle seat adjustment which addresses the above mentioned problems and/or which offers improvements or an alternative to conventional arrangements. In particular it is desirable to provide a vehicle seat adjustment position measurement system and method for a hydraulic vehicle seat adjustment system which is simpler, cheaper, and more reliable.

SUMMARY OF THE INVENTION

According to the present invention there is provided a hydraulic vehicle seat adjustment system, and a method for vehicle seat adjustment position measurement, as described in the accompanying claims. There is also provided a vehicle seat including such an adjustment system.

In an aspect of an embodiment of the invention there is provided a hydraulic vehicle seat adjustment system for providing positional adjustment of at least two seat adjustments of a vehicle seat. The system comprises a common source of hydraulic fluid, a first and second hydraulic actuators, a control unit, a common fluid flow sensor, and a seat position determining unit. The first hydraulic actuator is adapted to provide a first seat adjustment and is supplied with hydraulic fluid from the common source of hydraulic fluid. The second hydraulic actuator is adapted to provide a second, different, seat adjustment and is supplied with hydraulic fluid from the common source of hydraulic fluid. The control unit selectively controls and directs hydraulic fluid from the common source of hydraulic fluid to the respective first and second actuators. The common fluid flow sensor, in use, measures a flow of hydraulic fluid from the common source of hydraulic fluid. The seat position determining unit which is connected to control unit determines to which of the first and second actuators hydraulic fluid is in use being directed, and is also connected to the common fluid flow sensor to determine the flow of hydraulic fluid from the common source of hydraulic fluid to the respective first and second actuators to determine the adjusted position of the respective first and second actuator.

This arrangement provides a relatively simple and cost effective means to determine the position of multiple hydraulically adjusted seat adjustments. In particular costs, complexity, wiring and pipework are reduced and simplified by utilising only a single common flow sensor for the multiple adjustments. Furthermore a single flow sensor comprises a relatively simple sensor means for measuring the seat position as compared to some other types of position sensor arrangements.

The fluid flow sensor preferably comprises a positive displacement or mass flow sensor.

Preferably the common source of hydraulic fluid comprises a common source of pressurised hydraulic fluid, and the actuators are adapted to provide powered positional adjustment of the seat in response to pressurised hydraulic fluid supplied to the actuator from the common source of pressurised hydraulic fluid. The common source of pressurised hydraulic fluid preferably comprises a hydraulic pump which when operated generates and supplies pressurised hydraulic fluid.

In a further aspect of an embodiment of the invention there is provided a method for determining the position of a hydraulically adjusted vehicle seat adjustment in a hydraulic vehicle seat adjustment system for providing positional adjustment of at least two seat adjustments. The hydraulic vehicle seat adjustment system comprising a common source of hydraulic fluid, first and second hydraulic actuators adapted to provide respective first and second seat adjustment and supplied with hydraulic fluid from the common source of hydraulic fluid, and a control unit for selectively controlling and directing hydraulic fluid from the common source of hydraulic fluid to the respective first and second actuators. The method comprises monitoring the control unit to determine to which of the first and second actuators hydraulic fluid is being directed, and measuring a flow of hydraulic fluid from the common source of hydraulic fluid to determine the adjusted position of the respective first and second actuator.

In a yet further aspect of an embodiment of the invention there is provided a hydraulic vehicle seat adjustment system for providing powered positional adjustment of at least two seat adjustments. The system comprises a common source of pressurised hydraulic fluid, a first and second hydraulic actuators, and a control unit. The first hydraulic actuator is adapted to provide a first powered positional adjustment of the seat in response to pressurised hydraulic fluid supplied to the actuator from the common source of pressurised hydraulic fluid. Similarly the second hydraulic actuator adapted to provide a second powered positional adjustment of the seat in response to pressurised hydraulic fluid supplied to the actuator from the common source of pressurised hydraulic fluid. The control unit selectively controls and directs pressurised hydraulic fluid from the common source of pressurised hydraulic fluid to the first and second actuators.

Utilising a common source of pressurised hydraulic fluid reduces the costs and duplication of components required to provide powered positional adjustment of multiple seat adjustments.

Other advantageous features, advantages, and aspects of the invention will also be apparent to those skilled in the art from the following more detailed description.

DETAILED DESCRIPTION OF THE INVENTION

Figure 1:
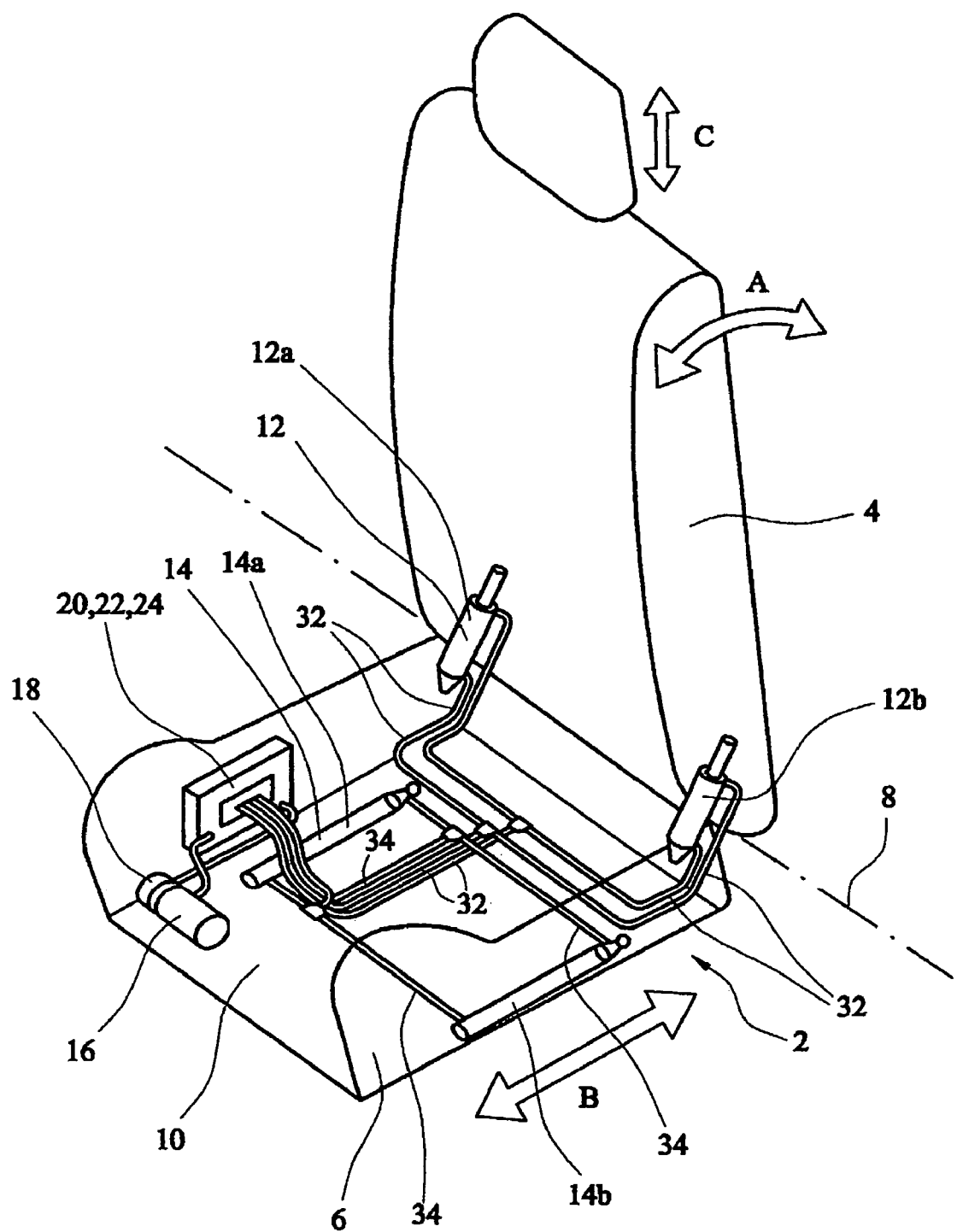
FIG. 1 is a schematic perspective illustration showing the general disposition of a hydraulic vehicle adjustment system within a vehicle seat.

Referring to FIG. 1 there is shown a schematic illustration of the disposition of a hydraulically powered seat adjustment system 10 within an outline of an automotive vehicle seat 2.

The vehicle seat 2 includes a seat back 4 which is pivotally connected to a bottom seat cushion 6, in a conventional manner, at one end about a horizontal lateral axis 8. The angle of the seat back 4 can accordingly be adjusted relative to the generally horizontally disposed seat bottom cushion 6 as indicated by arrow A. A pair of seat pivot hydraulic actuators 12a,12b, one on each lateral side of the seat 2, are operatively connected between the seat back 4 and seat bottom cushion 6 to adjust, control, and set the angle of the seat back 4.

The seat bottom cushion 6 is slidably mounted to the vehicle floor (not shown) in a conventional manner, for example using a pair of sliding seat tracks or rail assemblies (not shown). This allows the seat bottom cushion 6 and seat 2 to be slid fore and aft as indicated by arrow B. A pair of seat track hydraulic actuators 14a,14b are provided to adjust and set the fore and aft position of the seat bottom cushion 6 and seat 2 along the rail assemblies and within the vehicle.

It will be appreciated that the seat 2 may be mounted to provide for other movement and adjustment for example to adjust the height of the vehicle seat 2, and/or angle and tilt of the seat bottom cushion 6. The seat 2 may also include further movable portions for example a movable headrest (as indicated by arrow C), and/or the lumber support. Further pairs of actuators, or single actuators, may accordingly be similarly provided for such further adjustable mountings and/or movable portions.

The actuators 12,14, as illustrated comprise piston and cylinder arrangements as is the typical actuator arrangement conventionally used for hydraulic vehicle seat adjustment. The actuators 12,14 extend and retract in response to hydraulic fluid supplied to the actuator 12,14. Extension and retraction of the actuator 12,14 adjusts the position of the seat 2 or respective seat portion 4,6 to which the actuator 12,14 is connected. Other actuator arrangements could of course though be used in accordance with the invention.

Figure 2:
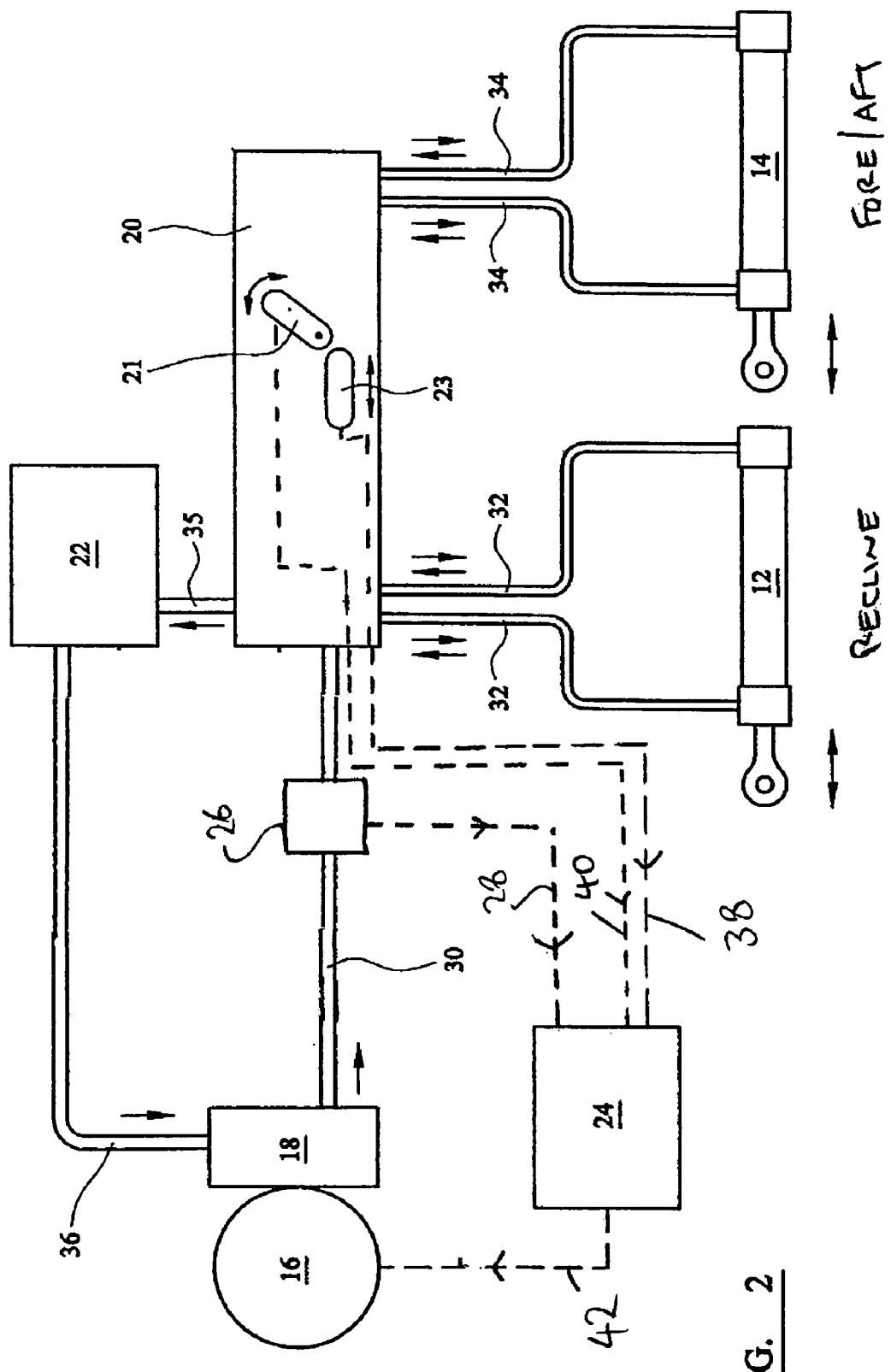
FIG. 2 is a schematic simplified illustration of the hydraulic vehicle adjustment system of FIG. 1 incorporating a seat adjustment position measurement arrangement in accordance with an embodiment of the present invention.

The hydraulic adjustment system 10, and the hydraulic circuit, is shown more clearly in simplified schematic form in FIG. 2. In FIG. 2 only one actuator 12,14 of each of the pair of actuators 12a,12b,14a,14b is shown for simplicity, with the other actuators connected in parallel with the respective illustrated actuator as shown in FIG. 1. Further actuators for any other seat adjustment may similarly be provided and connected to the control module 20.

The hydraulic adjustment system 10 comprises a hydraulic pump 18 driven by an electric motor 16. The pump 18 is connected to and supplies pressurised hydraulic fluid via a supply pipe 30 to a control module 20. The control module 20 includes control valves (not shown) which when operated selectively direct and control a flow pressurised fluid from the pump 18 to the respective hydraulic actuators 12,14 via actuator supply/return pipes 32,34. The control valves are activated by switches 21,23 operated by a user. Supply/return pipes 32,34 also return the hydraulic fluid from the hydraulic actuators 12,14 via the control module 20, and the control valves, to a reservoir 22 which stores an operating quantity of hydraulic fluid. The hydraulic fluid is supplied from the reservoir 22 to the pump 18 via a pump feed pipe 36 completing the hydraulic circuit.

The hydraulic circuit preferably operates at a relatively low hydraulic pressure under normal operation, typically 20 bar, and can be contrasted with conventional hydraulic systems which generally operate at much higher pressures.

In operation to adjust, for example, the angle of, and recline, the seat back 4 a seat occupant operates the respective switch 21 on the control module 20 on the side balance of the seat 2. This operates the respective control valves within the control module 20 to interconnect and direct hydraulic fluid from the supply pipe 30 to one of the supply/return pipes 34 connected to the seat pivot actuator 12, and to interconnect and direct hydraulic fluid from the other of the supply/return 34 pipes from the seat pivot actuator 12 to the return pipe 35. At the same time the switch 21, or movement of the valves, activates the motor 16 and pump 18 to generate a flow of pressurised hydraulic fluid which is supplied and directed to the seat pivot actuator 12 causing the actuator 12 to extend and recline the seat back 4. Once the desired reclined position is achieved the occupant releases the switch 21, which closes the valves and stops the pump 18. The closed valves prevent flow of fluid from the supply/return pipes 34 thereby preventing further movement of the seat pivot actuator 12 and so secure and lock the seat back 4 in the desired position. To move the seat back 4 to a more upright position the switch 21 is moved in the opposite sense, or a second switch is pressed, which operates the valves to direct and interconnect the supply/return pipes 34 to the supply 30 and return 35 in the opposite manner to produce an opposite flow of hydraulic fluid such that the pivot actuator 12 retracts moving the seat back 4 to a more upright position.

Adjustment of the fore and aft position and seat track actuators 12, as well as any other adjustment provided by any further actuators, operates in a similar manner.

In this hydraulically powered seat adjustment system 10 the single motor 16, pump 18 and reservoir 22 comprise a single common source of pressurised hydraulic fluid for the multiple seat adjustments, in this case both of the two separate powered seat adjustments (namely fore and aft adjustment and also seat back recline). Such a single common source, and hydraulic powered seat adjustment arrangement for multiple seat adjustments significantly reduces the costs and the complexity of an overall multiple seat adjustment system 10 capable of providing two or more different seat adjustments. It also reduces the space, weight, pipework, and connections required as compared to providing a separate pump and source of pressurised hydraulic fluid for each seat adjustment. In addition this arrangement, using a common source of hydraulic fluid for multiple seat adjustments, enables the seat position to more easily and simply be determined as described further below.

The hydraulic adjustment system 10 also comprises an electronic control unit (ECU) 24 which in use monitors and determines the adjusted position of the actuators 12,14 and seat adjustments. A single flow sensor 26 measures the flow of hydraulic fluid supplied via the supply pipe 30 to the control module 20. The flow sensor 26 is connected to the ECU 24 to provide the ECU 24 with a flow signal 28 indicative of the fluid flow through the supply pipe 30 to the control module 20. The ECU 24 is also connected to the control module 20 to receive actuator signals 38,40 corresponding to and indicating the operation and setting of the respective control valves (and/or the user switches 21,23). This provides an indication to the ECU 24 of the operation of the switches 21,23 and control valves and therefore of to which actuator 12,14 and in which sense hydraulic fluid is being directed around the supply/return pipes 32,34 to the actuators 12,14, by the control valves. Using these signals 38,40,28 the ECU 24 can thereby determine when the control valve and particular actuator 12,14 and adjustment is operated, and the flow and so amount of hydraulic fluid supplied from the pump 18 to the control unit 20 and on to a particular operating actuator 12,14 and seat adjustment. Based upon either prior calibration, and/or the known details (dimensions) of the respective actuators 12,14, relating to the movement generated in a respective actuator 12,14 by a given quantity of hydraulic fluid, the ECU 24 can determined the resultant movement of the actuators 12,14 and so of the seat adjustment. As a result, and starting from a known initial actuator 12,14 and seat adjustment position (or subsequently a previously determined stored actuator and seat adjustment position following initial movement) the ECU 24 can thereby determine the adjusted actuator 12,14 and seat position. The determined actuator 12,14 and seat adjustment position for a respective actuator 12,14 and seat adjustment position is then stored within a memory in the ECU 24 to provide the starting (initial) position for any subsequent adjustment position determination.

In the event that more than one of the switches 21,23 and/or control valves are simultaneously operated, the flow of hydraulic fluid from the pump 18 (and measured by the flow sensor 26) is supplied to more than one actuator 12,14 and seat adjustment. The split and ratio of flows to the respective actuators 12,14 is though dependent upon the respective flow resistance and is fixed and can be determined by prior calibration of the respective possible combinations. Accordingly when the ECU 24 identifies from the actuator signals 38,40 that more than one of the switches 21,23 and/or control valves are simultaneously being operated, the ECU 24 uses a respective prior calibration of flow split to determine the ratio of the flow measured by the sensor 26 which is directed to the respective actuators in order to thereby determine the adjusted actuator and seat position. Alternatively, and more simply and preferably, suitable interlocks can be provided to prevent more than one control valve and seat adjustment from being operated at any one time. In particular, and where the switches 21,23 activate the ECU 24 to then send a control signal to the operate the control valves, as described further below, the ECU 24 includes a preset actuator priority to ensure that only on actuator is adjusted at a time. If more multiple switches 21,23 are operated, requiring operation of more than one actuator 12,14, then the ECU 24 operates the control valves and actuators 12,14 in sequence.

Accordingly the position of a number of different seat adjustments, in this case both the fore and aft seat position and seat back recline, is determined using only a single flow sensor 26. This reduces costs, wiring, duplication of components, and simplifies the arrangement in particular as compared to providing separate individual sensors for each separate seat adjustment position measurement. In addition by using only a single flow sensor 26 reliability is improved and in the event of a failure fault finding is simplified. Since only a single flow sensor 26 is required, a relatively high quality and accurate sensor 26 can be used, and errors due to sensor variations between different multiple sensors are reduced, thereby improving the accuracy of position measurement. The single sensor 26 may also be located close to or with the ECU 24 and/or control unit 20 thereby further reducing wiring. Furthermore the single sensor 26 is located away from the actuators 12,14, in contrast to some conventional arrangements where position sensors must be located with the actuators or adjustments where they may be exposed and susceptible to damage.

In order to carry out the above functionality the ECU 24 preferably comprises a suitable basic microprocessor configured and operating suitable software to implement the above described functionality. The detail of such an implementation would be readily apparent to those skilled in the art with suitable microprocessor ECU 24 being known generally within the automotive art for a variety of control uses. The ECU 24 and software is preferably configured to establish suitable calibrations of the system 10 and position measurements. In particular the ECU 24 and software may be configured to include calibration of the sensor 26 and flow rates measured in relation to the respective actuators 12,14 and adjustments generated. In addition the calibrations may also take into account different operating volumetric relationships of each actuator 12,14 (which may or may not be linear depending upon the actuator 12,14 type and configuration), control valve switching characteristics, sensor quantisation errors and thermal variability, as well as calibration of other effects that may alter the measurements and accuracy provided. Such calibrations can be accomplished by the use of suitable predetermined 'look up tables' and/or algorithms defined within the ECU 24 and software/memory, or through look-up tales and algorithms (including respective calibration variables) that are set by the ECU 24 during a programming mode during (or after) initial assembly into a particular seat 2 and seat adjustment configuration. Suitable calibration techniques and means for implementing such calibrations within the ECU 24 will be readily apparent to those skilled in the art.

The ECU 24 may also be connected 42 to the motor 16 in order to control and activate the motor 16 when required and in response to the actuator signal 28,40 from the control module 20 indicating activation of the user switches 21,23 and control valves. The ECU 24 may also be connected to various other sensors and systems (not shown) to further control and monitor the operation of the seat adjustment and/or other function, for example operation of occupant protection systems (eg. airbags).

The ECU 24 unit may also include a further memory unit to store previously set seat positions for different occupants, and a control unit arranged to operate (via suitable solenoids) the control valves in place of, or in addition to, the manual switches 21,23. ECUs 24 with such preset memory units and arranged to operate powered seat adjustment systems are in themselves known in the art for use with conventional electromechanical seat adjustment systems and can be adopted and used with the above described hydraulic system 10. It will also be appreciated that in alternative embodiments the switches 21,23 may be associated with the ECU 24, with the ECU 24 then transmitting a control signal to solenoids in the control module 20 to operate the control valves.

The actuator signals 38,40 may be generated by simple electrical switches/contacts which are closed by operation of the control valves, or user switch 21,13. Such switches and contact arrangements are relatively simple and cheap to provide and implement, and may also advantageously be used for other control of the seat adjustment system 10 (for example activating the pump 18). In a preferred arrangement the control module 20 and control valves comprise a modified version of the control module 20 and control valves described in UK Patent application 0324552.9 filed on 22 Oct. 2003 (which is incorporated in its entirety herein by reference). Specifically the integral set of contacts which are arranged to activate the pump 18 described in UK Patent application 0324552.9 are arranged to instead or in addition provide the actuator signals 38,40 to the ECU 24.

As is also described in UK Patent application 0324552.9 the control module 20 may be combined with the reservoir 22. In addition the ECU 24 and control module 20, whilst shown as separate units, may be combined into a single assembly, and preferably with the flow sensor 26 in order to reduce external wiring and connections as well as providing a single assembly which can be fitted as a single part to the vehicle seat.

The flow sensor 26 preferably comprises a positive displacement or mass flow sensor. Alternatively the sensor may be a thermistor based flow sensor and is arranged in a bridge circuit to provide for temperature compensation in order to reduce errors. Other types of flow sensors 26 and flow sensing/measurement arrangements could of course be used.

Whilst the above embodiments have been described with reference to a powered hydraulic adjustment system, and this is the most preferred and advantageous application, the invention can also be applied to non-powered, manual, hydraulic adjustment systems in which either an occupant provides the pressurised hydraulic fluid, or the hydraulic adjustment systems simply provides locking of the seat adjustment which is manually adjusted.

It will also be appreciated that a number of further detail modifications can be made to the detailed arrangements described above.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A hydraulic vehicle seat adjustment system for providing positional adjustment of at least two seat adjustments of a vehicle seat, the system comprising:

a common source of hydraulic fluid;

a first hydraulic actuator adapted to provide a first seat adjustment and supplied with hydraulic fluid from the common source of hydraulic fluid;

a second hydraulic actuator adapted to provide a second seat adjustment and supplied with hydraulic fluid from the common source of hydraulic fluid;

a control module for selectively controlling and directing hydraulic fluid from the common source of hydraulic fluid to the respective first and second actuators;

a common fluid flow sensor which, in use, measures a flow of hydraulic fluid from the common source of hydraulic fluid; and a seat position determining unit which is connected to receive a signal from the control module indicating to which of the first and second actuators hydraulic fluid is to be directed, and also is connected to receive a signal from the common fluid flow sensor indicating the amount of the flow of hydraulic fluid from the common source of hydraulic fluid to the respective first and second actuators, wherein the seat positioning determining unit determines the adjusted position of the respective first and second actuators in response to the signals from the control module and the common fluid flow sensor.

2. A hydraulic vehicle seat adjustment system as claimed in claim 1 in which the fluid flow sensor comprises a positive displacement fluid flow sensor.

3. A hydraulic vehicle seat adjustment system as claimed in claim 1 in which the fluid flow sensor comprises a mass flow sensor.

4. A hydraulic vehicle seat adjustment system as claimed in claim 1 further comprising a memory unit for storing the determined adjusted seat positions.

5. A hydraulic vehicle seat adjustment system as claimed in claim 1 in which the control unit and a seat position determining unit are integrated into a single assembly.

6. A hydraulic vehicle seat adjustment system as claimed in claim 1 in which the control unit, seat position determining unit, and common fluid flow sensor are integrated into a single assembly.

7. A hydraulic vehicle seat adjustment system as claimed in claim 1 in which the common source of hydraulic fluid comprises a common source of pressurised hydraulic fluid, and the actuators are adapted to provide powered positional adjustment of the seat in response to pressurised hydraulic fluid supplied to the actuator from the common source of pressurised hydraulic fluid.

8. A hydraulic vehicle seat adjustment system as claimed in claim 7 in which the common source of pressurised hydraulic fluid comprises a hydraulic pump which when operated generates and supplies pressurised hydraulic fluid.

9. A hydraulic vehicle seat adjustment system for providing powered positional adjustment of at least two seat adjustments, the system comprising:
   a common source of pressurised hydraulic fluid;
   a first hydraulic actuator adapted to provide a first powered positional adjustment of the seat in response to pressurised hydraulic fluid supplied to the actuator from the common source of pressurised hydraulic fluid;
   a second hydraulic actuator adapted to provide a second powered positional adjustment of the seat in response to pressurised hydraulic fluid supplied to the actuator from the common source of pressurised hydraulic fluid;
   a control module for selectively controlling and directing pressurised hydraulic fluid from the common source of pressurised hydraulic fluid to the first and second actuators;
   a common fluid flow sensor that measures a flow of pressurised hydraulic fluid from the common source of hydraulic fluid; and
   a seat position determining unit which is connected to receive a signal from the control module to indicating to which of the first and second actuators pressurised hydraulic fluid is to be directed, and also is connected to receive a signal from the common fluid flow sensor indicating the amount of the flow of pressurised hydraulic fluid from the common source of pressurised hydraulic fluid to the respective first and second actuators, wherein the seat positioning determining unit determines the adjusted position of the respective first and second actuators in response to the signals from the control module and the common fluid flow sensor.

10. A hydraulic vehicle seat adjustment system as claimed in claim 9 in which at least one of the first and second actuators comprises a hydraulic piston and cylinder arrangement.

11. A hydraulic vehicle seat adjustment system as claimed in claim 9 in which at least one of the first and second actuators comprises a pair of actuators operating together to provide a single powered seat adjustment.

12. A hydraulic vehicle seat adjustment system as claimed in claim 9 in which the first hydraulic actuator is adapted to provide powered seat adjustment of the fore and aft position of the seat.

13. A hydraulic vehicle seat adjustment system as claimed in claim 9 in which the second hydraulic actuator is adapted to provide powered seat adjustment of the seat back angle.

14. A hydraulic vehicle seat adjustment system as claimed in claim 9 further comprising at least one further hydraulic actuator adapted to provide a respective further seat adjustment and supplied with hydraulic fluid from the common source of hydraulic fluid.

* * * * *